US012670197B2

(12) United States Patent
Gupta et al.

(10) Patent No.: US 12,670,197 B2
(45) Date of Patent: Jun. 30, 2026

(54) ENHANCED AND ADAPTIVE COLLECTIONS ENGINE(S) FOR ELICITING, AGGREGATING, AND COLLATING RESPONSES FROM DISPERSED PARTIES

(71) Applicant: Oracle International Corporation, Redwood City, CA (US)

(72) Inventors: Deepali Gupta, Noida (IN); Abhinav Verma, Noida (IN); Uday Shankar, Allen, TX (US); Shibi Sridharan Nirappel, Monroe Township, NJ (US); Jeegnesh Patel, High Wycombe (GB); Clark Elms, Seattle, WA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/613,812

(22) Filed: Mar. 22, 2024

(65) Prior Publication Data
US 2025/0298826 A1 Sep. 25, 2025

(51) Int. Cl.
*G06F 16/335* (2019.01)
*G06F 16/334* (2025.01)

(52) U.S. Cl.
CPC .......... *G06F 16/335* (2019.01); *G06F 16/334* (2019.01)

(58) Field of Classification Search
CPC ............................. G06F 16/335; G06F 16/334
See application file for complete search history.

(56) References Cited

U.S. PATENT DOCUMENTS

| | | | | |
|---|---|---|---|---|
| 11,475,443 B1* | 10/2022 | Neuse | ................. | H04L 63/0428 707/608 |
| 11,645,603 B1* | 5/2023 | Baker | .............. | G06Q 10/06398 705/7.42 |
| 2007/0067363 A1* | 3/2007 | Cooper | .................. | G16H 40/67 707/999.204 |
| 2013/0218829 A1* | 8/2013 | Martinez | ................ | G06Q 10/10 707/608 |
| 2017/0323395 A1* | 11/2017 | Guzman | .............. | G06Q 10/063 707/608 |
| 2018/0033092 A1* | 2/2018 | Wang | .................... | G06Q 40/123 707/608 |
| 2022/0138775 A1* | 5/2022 | Mamdur | ............ | G06Q 30/0201 707/608 |
| 2023/0214509 A1* | 7/2023 | Kahawala | ............. | G06F 40/106 707/608 |
| 2023/0306000 A1* | 9/2023 | Greehy | ................. | G06F 16/176 707/608 |
| 2024/0281547 A1* | 8/2024 | Jain | ..................... | G06F 21/6209 707/608 |

* cited by examiner

*Primary Examiner* — Yuk Ting Choi

(57) ABSTRACT

Various embodiments of the present technology generally relate to systems and methods for providing a collections engine. In an example, a method includes receiving, by a collections engine, a source document having a dataset and generating, by the collections engine, a response collection having records based on the dataset. The collections engine may assign a record owner for each of the records and determine one or more completion conditions for each of the records. The collections engine may also determine one or more escalation conditions for an incomplete record, the incomplete record being a record in which one or more of the completion conditions are not met. The collections engine may transmit a first record of the plurality of records to a respective record owner.

20 Claims, 13 Drawing Sheets

Collections Engine(s) 102

111

Application Service

103

101

105

107

Record Owners

109

Collection Creator

100

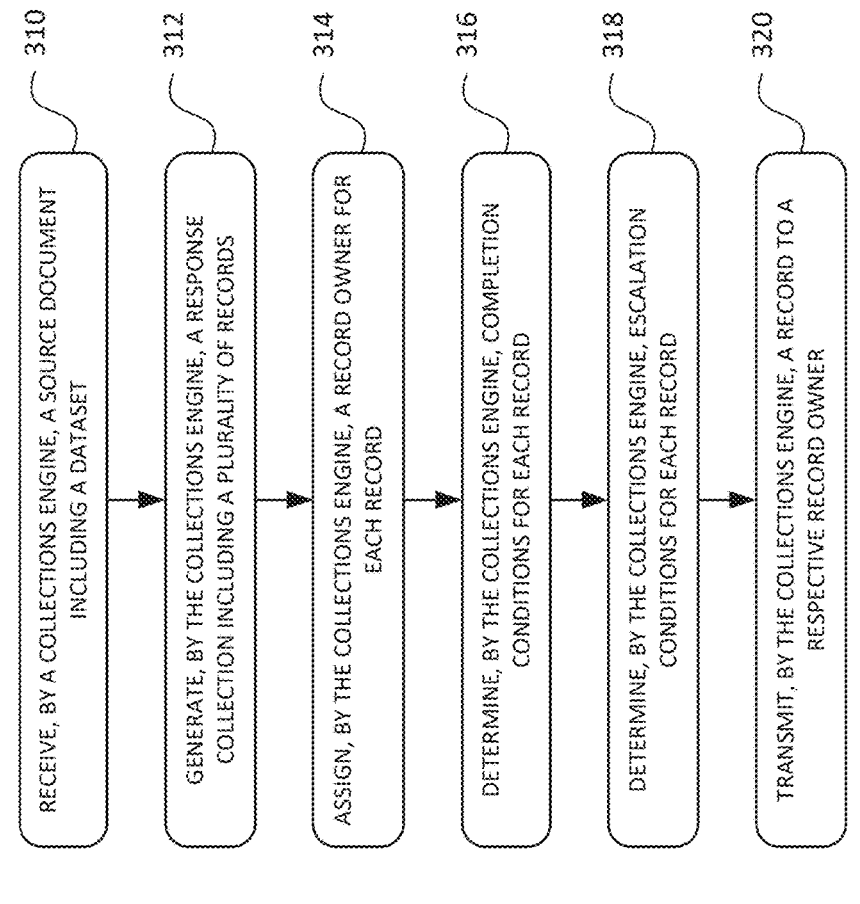

RECEIVE, BY A COLLECTIONS ENGINE, A SOURCE DOCUMENT INCLUDING A DATASET — 310

GENERATE, BY THE COLLECTIONS ENGINE, A RESPONSE COLLECTION INCLUDING A PLURALITY OF RECORDS — 312

ASSIGN, BY THE COLLECTIONS ENGINE, A RECORD OWNER FOR EACH RECORD — 314

DETERMINE, BY THE COLLECTIONS ENGINE, COMPLETION CONDITIONS FOR EACH RECORD — 316

DETERMINE, BY THE COLLECTIONS ENGINE, ESCALATION CONDITIONS FOR EACH RECORD — 318

TRANSMIT, BY THE COLLECTIONS ENGINE, A RECORD TO A RESPECTIVE RECORD OWNER — 320

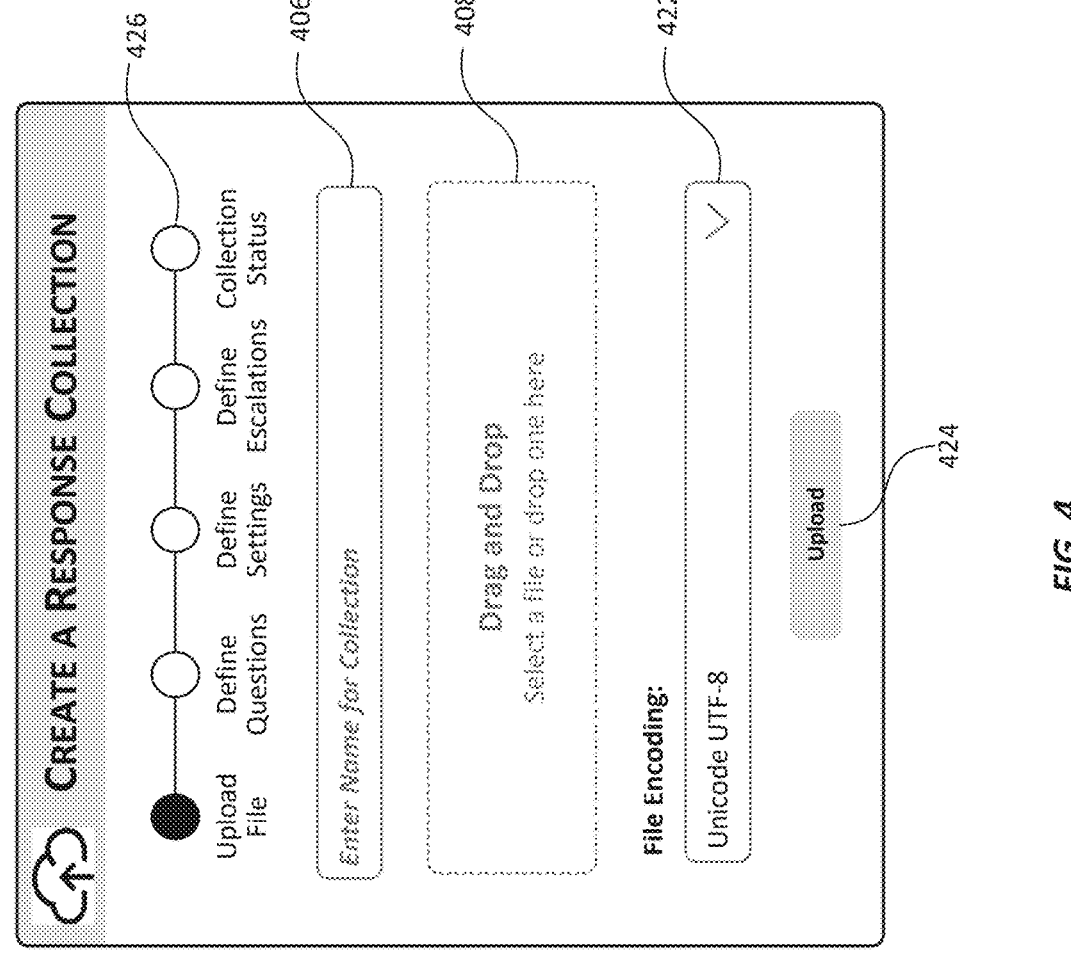
*FIG. 4*

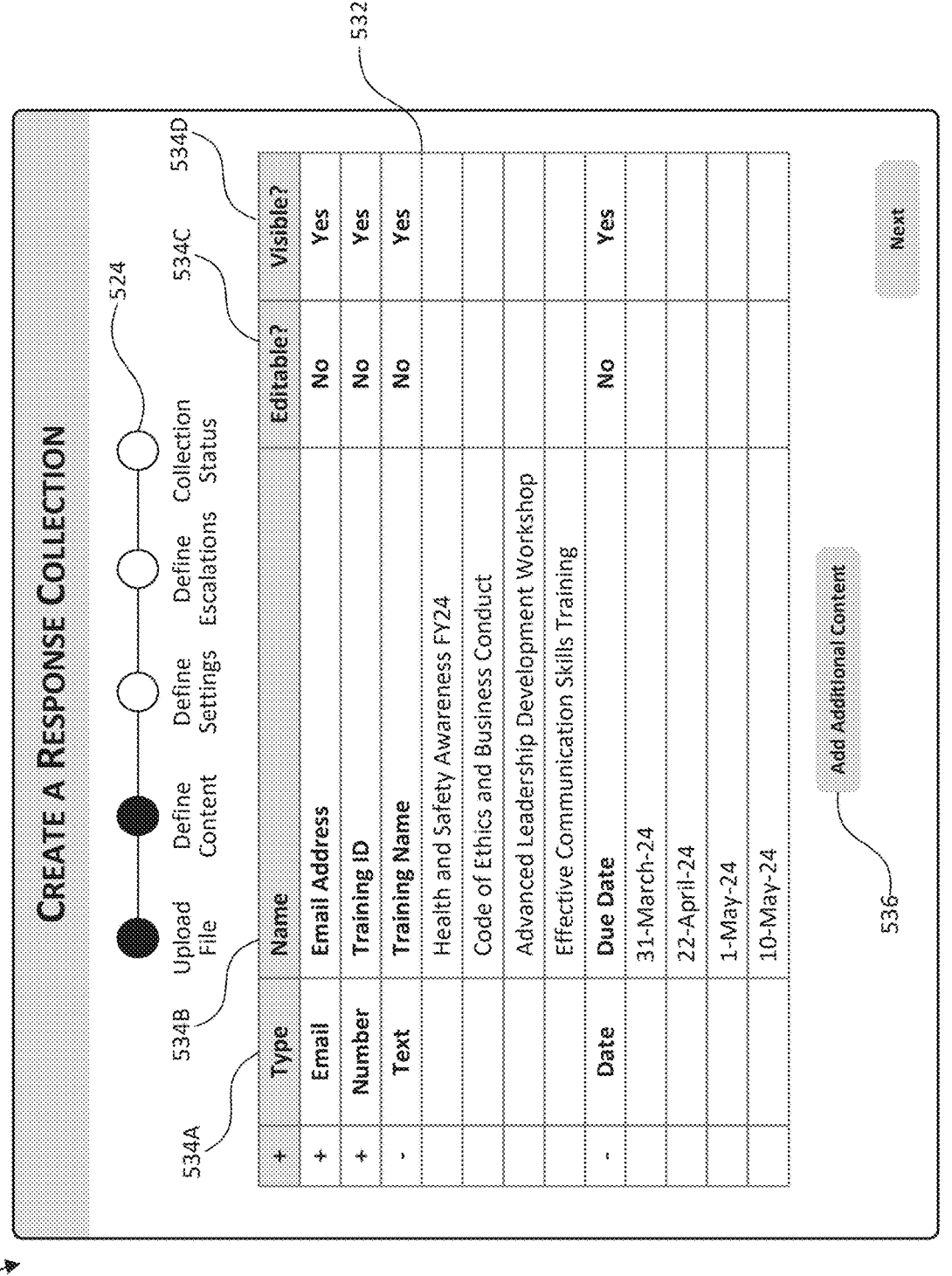

CREATE A RESPONSE COLLECTION

Upload          Define          Define          Define          Collection
File            Content         Settings        Escalations     Status

| Type | Name | Editable? | Visible? |
|------|------|-----------|----------|
| Email | Email Address | No | Yes |
| Number | Training ID | No | Yes |
| Text | Training Name | No | Yes |
| | Health and Safety Awareness FY24 | | |
| | Code of Ethics and Business Conduct | | |
| | Advanced Leadership Development Workshop | | |
| | Effective Communication Skills Training | | |
| Date | Due Date | No | Yes |
| | 31-March-24 | | |
| | 22-April-24 | | |
| | 1-May-24 | | |
| | 10-May-24 | | |

534A    534B    534C    534D    524    532

Add Additional Content          536

Next

| Status | Name | # Records | % Completed | Updated On | Updated By |
|--------|------|-----------|-------------|------------|------------|
| Live | Training Completion Status | 120 | 70% | Feb-22-24 | Kristi K. |
| Draft | Health Awareness | 567 | 0% | Feb-27-24 | Gary A. |
| Paused | Onboarding Demo | 25 | 10% | Feb-21-24 | Anisha P. |
| Completed | HR Check-in | 82 | 100% | Feb-8-24 | Sarah. B. |
| Live | Company Survey | 2,102 | 50% | Feb-18-24 | Kristi K. |

COLLECTIONS STATUS

1200

1225

1227A 1227B 1227C 1227D 1227E 1227F

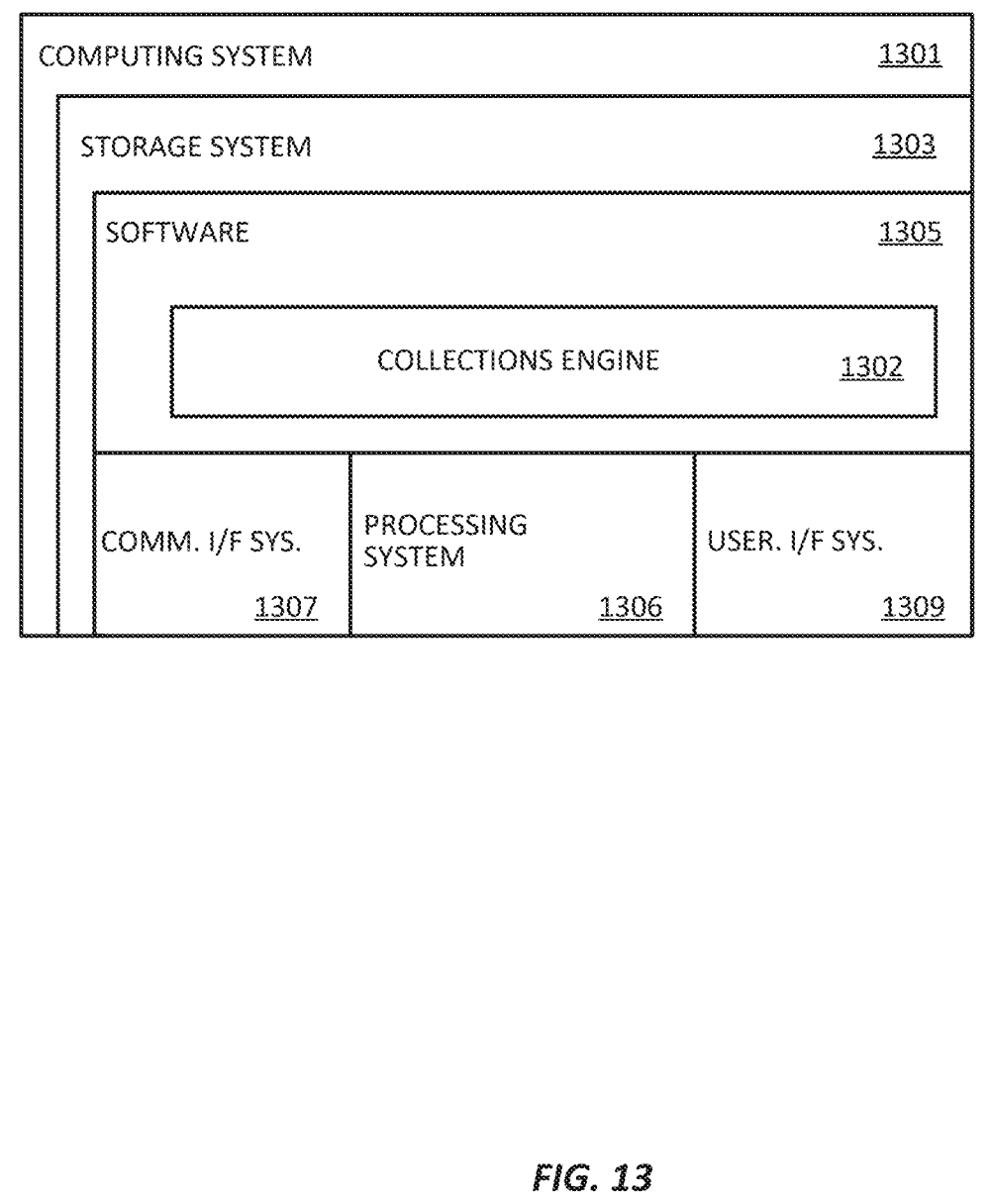

COMPUTING SYSTEM                                              1301

STORAGE SYSTEM                                           1303

SOFTWARE                                             1305

COLLECTIONS ENGINE                    1302

| COMM. I/F SYS.<br><br>1307 | PROCESSING SYSTEM<br><br>1306 | USER. I/F SYS.<br><br>1309 |
|---|---|---|

*FIG. 13*

ENHANCED AND ADAPTIVE COLLECTIONS ENGINE(S) FOR ELICITING, AGGREGATING, AND COLLATING RESPONSES FROM DISPERSED PARTIES

TECHNICAL FIELD

Various embodiments of the present technology generally relate to response collections. More specifically, embodiments of the present technology relate to systems and methods for providing a collections engine for eliciting, aggregating, and collating responses from dispersed parties.

BACKGROUND

Response collections, such as surveys, are used for collecting and analyzing information from a targeted group of individuals to gain insights into their opinions, behaviors, and preferences. In business settings, organizations utilize response collections as powerful tools to gather valuable data for decision-making, market research, and strategic planning. Response collections can be designed to assess customer satisfaction, employee engagement, product feedback, compliance and adherence, market trends, or any other relevant aspect of business operations. By leveraging responses from response collections, organizations can identify areas for improvement, measure the effectiveness of initiatives, make informed decisions to enhance overall performance, and ensure compliance with various standards or regulations. Response collections offer a structured and scalable approach to gathering diverse perspectives, enabling businesses to adapt to changing landscapes, understand their stakeholders, and stay responsive to evolving market demands.

Conventional response collection technologies face significant challenges, including the complexity of collecting and collating responses across diverse communication platforms. In an era dominated by digital communication across various online channels, the integration and consolidation of responses from sources like email, web forms, and social media becomes intricate, potentially leading to inconsistencies and errors in traditional response collections. Moreover, conventional response collections struggle with data retention and auditing capabilities of collected responses. The struggle to adapt to the dynamic nature of modern communication platforms further hampers the agility needed for capturing real-time feedback. Additionally, these conventional technologies exhibit shortcomings in access control mechanisms, particularly concerning the management of individual responses. Traditional response collection tools often lack robust features for secure and granular access controls, making it difficult to restrict individuals to viewing or updating only their specific record content. This deficiency becomes particularly pronounced when respondents need to access and modify their submitted responses, raising the risk of unauthorized access and compromising the confidentiality and integrity of response collections.

Furthermore, conventional response collection techniques present additional challenges that impact their effectiveness. Editability concerns pose a notable issue, as traditional response collection tools often struggle with allowing selective edits. It can be difficult to modify specific fields while keeping others non-editable, potentially leading to inaccuracies or incomplete data. This limitation hampers the flexibility required for refining record content without compromising the integrity of existing record content. Moreover, prompting respondents to complete their responses can be problematic with conventional methods. Traditional response collections may lack dynamic features to encourage and remind participants to provide comprehensive responses, resulting in incomplete response collections.

Accordingly, there exists a need for improved enhanced and adaptive collections engine(s) as provided herein that elicit, aggregate, and collate responses from dispersed parties.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing a collections engine for eliciting, aggregating, and collating responses from dispersed parties. In an aspect, the collections engine provides an enhanced and adaptive approach to gathering responses from recipients (e.g., record owners) of a response collection. Each response collection includes multiple records, each of which is assigned to a respective record owner. The record owner may be responsible for responding to record content, such as prompts or queries, that are present in a given record. In some cases, the record owner may delegate the record to another individual. In such a case, the collections engine may transfer ownership of the record to the delegated individual.

To generate the response collection, the collections engine may receive a source document. From the source document, the collections engine may extract or process a dataset included in the source document to generate record content. Record content may include editable content (e.g., queries or prompts) and may include non-editable content (e.g., due dates, email addresses, employee ID numbers). In some cases, in addition to the record content extracted from the source document, the collections engine may generate additional content. For example, a collections creator may generate a query to add to the record content.

For the record content, the collections engine may generate one or more completion conditions. That is, for a given record within the response collection to be completed, the collection engine may determine whether the associated completion conditions are met. If the completion conditions are not met, then the collections engine may determine the record to be an incomplete record. For incomplete records, the collections engine may monitor the associated records to determine whether one or more escalation conditions are met. Escalation conditions may be conditions that, when met, prompt the collections engine to perform one or more escalation actions. For example, if the record is still incomplete by a specified date, then an escalation condition may be met, and the collections engine may generate an escalation communication that is sent to the record owner and/or a superior of the record owner.

In some embodiments, the collections engine may also generate a status report of the collection. For example, the collections engine may generate a report including a completion status and an escalation status for each record within the collection. In some cases, the collections engine may generate a collections status report which includes a report of all collections generated by the collections engine overall or for a particular collections creator. Such a report may provide the completion status of each collection with the report, along with other relevant information.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 3 illustrates an example response collection process, according to an embodiment herein;

FIG. 4 illustrates an example prompt for generating a response collection, according to an embodiment herein;

FIG. 5 illustrates an example graphical user interface (GUI) of record content, according to an embodiment herein;

FIG. 13 shows an example computing device suitable for providing a collections engine and its related functions, according to an embodiment herein.

Figure 1:
FIG. 1 illustrates an example operational environment for a system for providing one or more features of a collections engine, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Response collections, particularly in the form of surveys, play an indispensable role in the organizational landscape by serving as vital tools for gathering and analyzing information from a targeted audience. In the dynamic realm of business settings, organizations rely heavily on these response collections to acquire essential data that fuels decision-making, informs market research, and guides strategic planning. Tailored response collections can delve into crucial areas such as customer satisfaction, employee engagement, product feedback, market trends, and various other facets of business operations. The insights derived from these meticulously crafted response collections empower organizations to pinpoint areas for improvement, gauge the effectiveness of initiatives, and make informed decisions that elevate overall performance. Embracing response collections provides businesses with a structured and scalable approach to accessing a spectrum of perspectives, allowing them to not only navigate changing landscapes but also to comprehend the needs of their stakeholders and remain agile in response to evolving market demands.

Conventional response collection technologies encounter a variety of challenges, particularly in scenarios involving large-scale respondent engagement, such as within sizable organizations. Eliciting, aggregating, and collating responses from a high number of participants becomes an increasingly intricate task, mainly due to the diverse communication platforms utilized by respondents. Traditional response collection methods often struggle to seamlessly gather and integrate responses across varied channels, such as email, web forms, and social media, leading to potential data discrepancies and inefficiencies. Ensuring uniformity in responses to a response collection can be important as diversity or variety in responses can lead to potential inconsistencies and errors. As such, traditional response collections may struggle to adapt to the dynamic nature of modern communication platforms, hindering the agility needed to capture real-time feedback.

Editability concerns exacerbate the challenges inherent in conventional response collection technologies. Effectively managing access to edit response collection content poses a complex issue, as traditional tools may lack the necessary precision for ensuring secure and controlled access. This not only gives rise to security concerns but also complicates efforts to enable collaborative editing while safeguarding the integrity of collected responses. Similarly, in the realm of traditional response collection tools, the absence of robust features for secure and granular access controls adds to the difficulty of restricting individuals to viewing or updating only their specific record content. This limitation assumes particular significance in situations where respondents need to access and modify their submitted responses, as the absence of proper access controls increases the risk of unauthorized access to sensitive information, jeopardizing the confidentiality and integrity of the response collection.

Furthermore, motivating participants to actively engage and complete response collections presents a persistent challenge. Traditional methods often fall short in incorporating the dynamic features necessary to prompt and captivate participants, leading to diminished response rates and incomplete datasets. The significance of eliciting robust responses from participants cannot be overstated; it is crucial for obtaining comprehensive and valuable data that accurately reflects the diverse perspectives and experiences of the queried population. When traditional response collections lack these dynamic features, they risk resulting in incomplete response collections, compromising the depth and accuracy of the insights gained. The ability to effectively encourage and remind participants to provide thoughtful and thorough responses is vital for ensuring the relevance and reliability of the collected data in the context of response collection and analysis.

To address the shortcomings of conventional response collection technologies, example collections engines are provided herein. As described in greater detail below, the example collections engines provide an enhanced and adaptive approach to eliciting, aggregating, and collating responses to a response collection across dispersed parties. In particular, collection engines allow a user, referred to herein as a collection creator, to create a response collection directly from a source document, such as a spreadsheet. From a dataset within the source document, the collection creator can select record content to be included in each record within the response collection, as well as add additional content, such as queries or prompts to the record.

The response collection includes multiple records meant to elicit a response. Each record within a given collection can be assigned to a record owner. The record owner may be an individual who is responsible for completing the record. In some cases, the record owner or the collection creator may delegate the record ownership to another individual for completion. As part of generating the response collection, the collection creator may identify or select completion conditions for the response collection. That is, the collection creator may establish conditions, such as rules or expressions, that should be met or satisfied in order for a given record to be completed. As used herein, completion of a record means that a response to the record has been received such that no further response is required by the record owner or delegate. A record in which the completion conditions are not met is referred to herein as an incomplete record. In some cases, the record may close after completion, such that the record owner can no longer access or edit the record.

In addition to completion conditions, the collection creator may also identify or set escalation conditions. Escalation conditions are conditions that when met prompt the collection engine to perform one or more escalation actions. Escalation actions may include generating and sending out an escalation communication. In some cases, the escalation communication may be a reminder to the record owner of the outstanding record requiring his or her response, while in other cases, the escalation communication may be a communication that is sent to a superior of the record owner, such as a manager, notifying the superior of the incomplete record. As will be described in greater detail below, the escalation action may follow an escalation hierarchy, with a different escalation action at each level of the escalation hierarchy and be bounded by an escalation limit.

The collection engine may also generate a report or display of response collections created by a collection creator. That is, the collection engine may generate a report showing each of the response collections created by a given collection creator, along with a status of each of the response collections. As can be appreciated, providing a comprehensive view of the response collections can provide the collection creator crucial information on the completion stage of each response collection, indicating whether a response collection is in draft, progress, paused, or completed. This transparency not only fosters trust among the participants but also helps the collection creator manage their workflow effectively. By clearly delineating the status of each response collection, the collection creator can prioritize tasks, allocate resources efficiently, and ensure timely delivery of high-quality response collections, thereby maximizing the impact of collection responses.

Turning now to the Figures, FIG. 1 illustrates an example operational environment for a system 100 for providing one or more features of a collections engine, according to an embodiment herein. The example system 100 includes an application service 101. The application service 101 employs one or more server computers 103 co-located with respect to each other or distributed across one or more data centers. Example servers include web servers, application servers, virtual or physical servers, or any combination or variation thereof, of which computing apparatus 1301 in FIG. 13 is broadly representative.

Broadly speaking, the application service 101 provides software application services to end points, such as client devices 105, 107, and 109, examples of which include productivity software for creating content (e.g., word processing, spreadsheets, and presentations), email software, and collaboration software. The client devices 105, 107, and 109 may load and execute software applications locally that interface with services and resources provided by the application service 101. The applications may be natively installed and executed applications, web-based applications that execute in the context of a local browser application, mobile applications, streaming applications, or any other suitable type of application. Example services and resources provided by the application service 101 include front-end servers, application servers, content storage services, authorization and authentication services, and the like.

The client devices 105, 107, and 109 communicate with application service 101 via one or more internets and intranets, the Internet, wired and wireless networks, local area networks (LANs), wide area networks (WANs), or any other type of network or combination thereof. Examples of the client devices 105, 107, and 109 may include personal computers, tablet computers, mobile phones, gaming consoles, wearable devices, Internet of Things (IoT) devices, and any other suitable devices, of which computing apparatus 1301 in FIG. 13 is also broadly representative.

To aid a user associated with the client device 109 with his or her role within an organization or expand his or her knowledge based within a personal sphere, the application service 101 includes a collections engine 102. The collections engine 102 generates response collections and elicits, aggregates, and collates responses received from users associated with the client devices 105 and 107 based on a given response collection. As can be appreciated, response collections are often used by organizations to gather valuable insights into various aspects of the workplace environment, employee satisfaction, business development, and overall organizational health, as well as perform market or product research. Response collections, as used herein may encompass a range of inquiry or data collection methodologies or techniques, such as surveys, polls, questionnaires, studies, research, censuses, interviews, feedback sessions, and audits.

In the illustrated example, the collection creator, via the client device 109 may generate a response collection using the collections engine 102. A response collection may include multiple records, each record directed to elicit a response from a recipient (e.g., record owner). Each record includes record content that requires input from an associated record owner. For example, each record may include a query, such as a questionnaire or questions, that require responses by a respective record owner. Record generation and examples of response collections and record content are described in greater detail below with respect to FIGS. 2-12.

Once a response collection is generated, the collections engine 102 transmits records to their respective record owner. In the illustrated example, the record owners correspond to the client devices 105 and 107. While only two client devices 105 and 107 are illustrated, it should be appreciated that there may be any number of client devices 105 and 107. For example, in a large organization there maybe hundreds if not thousands of personnel. As such, if the collection creator associated with the client device 109 generated a response collection and assigned a record to each of the personnel at the large organization, then there would be hundreds if not thousands of record owners (e.g., client devices 105 and 107). Similarly, while the discussion herein is made with respect to only a single collection creator (e.g., the client device 109), there may be any number of collection creators generating response collections via the collections engine 102.

Once the response collection is generated and transmitted to the client devices 105 and 107, the collections engine 102 may monitor the responses made by the client devices 105 and 107 with respect to the records. When a response is received, the collections engine 102 may determine whether the one or more completion conditions are met. If the completion conditions are met, then the collections engine 102 may mark the associated record as complete, and in some cases close out the record. If the completion conditions are not met, however, the collections engine 102 may determine whether one or more escalation conditions are met. For example, if there is a due date for responses to be supplied for the records, then the collections engine 102 may determine that based on the date an escalation condition is met or not. If an escalation condition is met, then the collections engine 102 may determine a corresponding escalation action to be performed. In an example, an escalation action may include generating and sending an escalation communication to the record owner and/or a superior of the record owner. Completion conditions and escalation conditions (and associated escalation actions) are described in greater detail below with respect to FIGS. 2-3 and 8-10).

To aid the client device 109 (e.g., collection creator) with managing response collections, the collections engine 102 may also generate a report or display of ongoing response collections. As can be appreciated, providing a collections creator with a comprehensive perspective on response collections or a given response collection provides the creator with essential insights into the completion stage of each collection. Such information may indicate whether a response collection is in draft, progress, paused, or completed. The insights provided by a collections report not only nurtures trust among record owners and collection creators, but also proves instrumental in helping the collection creator efficiently manage his or her workflow. By distinctly outlining the status of each response collection, the collection creator gains the ability to prioritize tasks, allocate resources judiciously, and ensure the timely delivery of quality response collections. This, in turn, maximizes the impact of the responses collected, contributing to the overall success and effectiveness of the response collection process. Response collection reports are described in greater detail below with respect to FIGS. 2-3 and 11-12.

To provide these functions, the collections engine 102 may employ one or more server computers 111 co-located with respect to each other or distributed across one or more data centers, of which computing apparatus 1301 in FIG. 13 is broadly representative. In some embodiments, the collections engine 102, along with its various components, may be hosted on the server computers 111 as well. In other embodiments, the collections engine 102 and/or various components of the collections engine 102 may be hosted separately from the application service 101, such as by a third party. Various configurations are contemplated herein.

Figure 2:
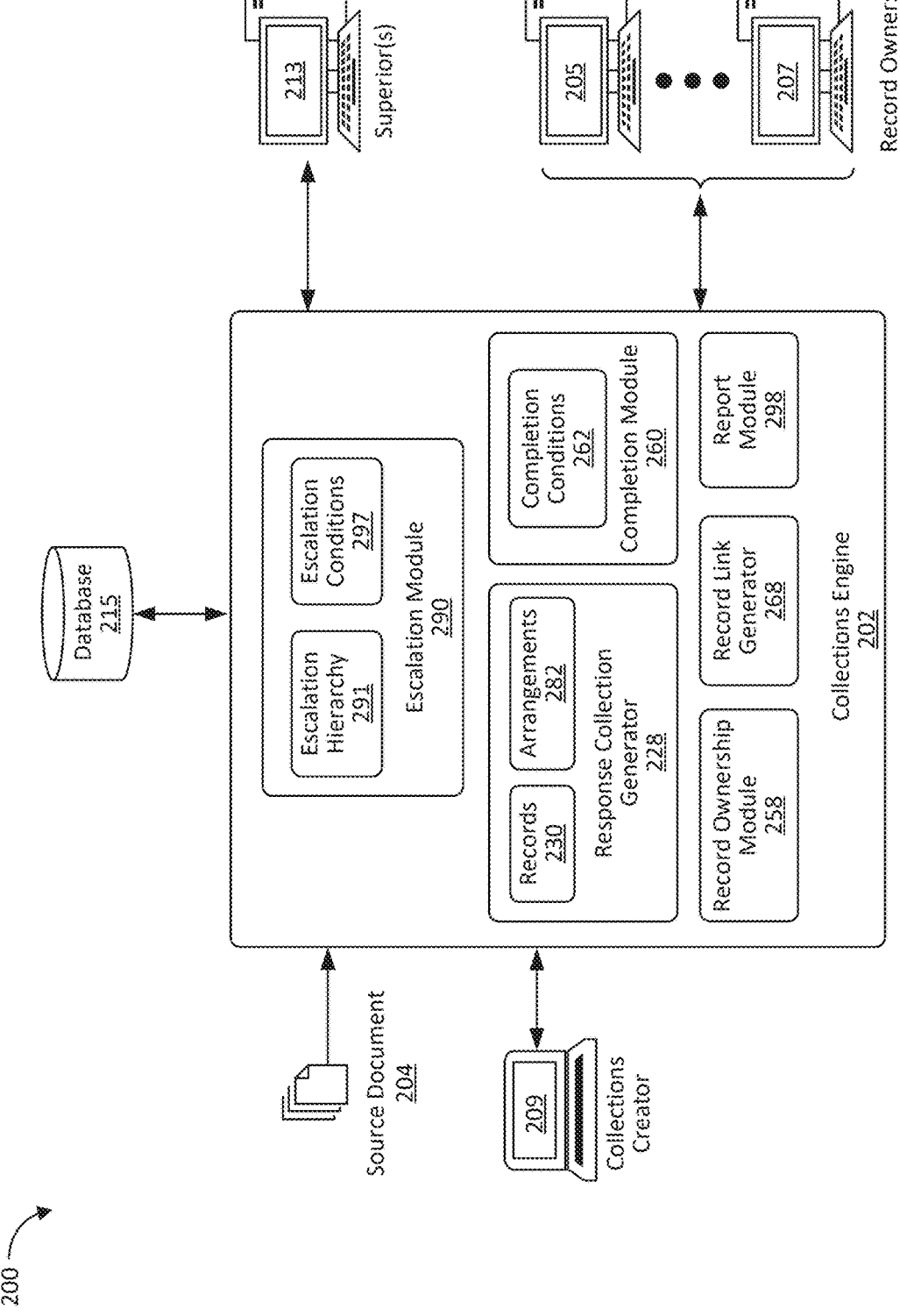
FIG. 2 illustrates an illustrative system providing an example collections engine, according to an embodiment herein.

Referring now to FIG. 2, an illustrative system 200 providing an example collections engine 202 is illustrated, according to an embodiment herein. The collections engine 202 may be the same or similar to the collections engine 102. For example, the collections engine 202 may be part of an application service, such as the application service 101, such to aid users, such as a collection creator 209, in generating, distributing, and completing response collections to recipients, such as record owners 205-207. The collection creator 209 may be the same or similar to the collection creator associated with the client device 109, and the record owners 205-207 may be the same or similar to the users associated with the client devices 105 and 107.

For ease of explanation, FIG. 2 is described in conjunction with FIGS. 3-12. As the following discussion expands, a corresponding Figure is referenced in turn. It should be appreciated that while a corresponding Figure is referenced during the discussion of FIG. 2, components, elements, and steps from any other Figures described herein may be equally applicable. Starting with FIG. 3, FIG. 3 provides an example response collection process, in particular, a process 300 for providing the collections engine 202 and one or more of its functions, according to an embodiment herein. Although FIG. 3 is described with reference to FIG. 2, it should be appreciated that any steps of the process 300 may be used with components and elements from any of the other figures described herein.

Returning now to FIG. 2, to generate a response collection, the collections creator 209 may request to create a response collection via the collections engine 202. To initiate creating of the response collection, the collection creator 209 may provide a source document 204 to the collections engine 202 (310). For example, the collections engine 202 may provide a prompt to the collections creator 209 for uploading the source document 204.

Referring now to FIG. 4, an example prompt 400 for generating a response collection is illustrated, according to an embodiment herein. As shown, the prompt 400 may include a field 406 for naming the response collection and a source document field 408. The source document 204 may be a file or document that is external to the collections engine 202 and/or the application service 101. As such, to provide the source document 204 to the collections engine 202, the collection creator 209 may drag and drop, or otherwise link the source document 204 to the collections engine 202. Example source documents 204 may include a spreadsheet, a CSV (Comma-Separate Values), JSON (JavaScript Object Notation), XML (eXtensible Markup Language), database tables, text files, HDF5 (Hierarchical Data Format version 5), and the like.

Once the source document 204 is provided via the source document field 408, the collection creator 209 may name the response collection via the field 406 and identify the file encoding of the source document 204 via the field 422. As those skilled in the art readily appreciate, the file encoding may vary depending on the type of source document 204, but example file encodings may include Unicode UTF-8 or UTF-16, ISO-8859-1 (Latin-1), ASCII, and the like. When the collection creator 209 provides inputs via the fields 406, 408 and 422, the collection creator 209 can select option 424 to upload the source document 204 to the collections engine 202.

As illustrated, the prompt 400 also includes a progress bar 426. The progress bar 426 may illustrate to the collection creator 209 where in the collection generation process the current action stands. Although the progress bar 426 carries through the remaining Figures to indicate the various steps of the collection generation process, it should be appreciated that one or more of the steps provided via the progress bar 426 may be presented or removed in contemplated various.

The source document 204 may be uploaded and/or received by a response collection generator 228 of the collections engine 202. The response collection generator 228, referred to hereinafter as generator 228, may generate a response collection based on the source document 204 (312). In particular the generator 228 may generate multiple records 230 of the response collection based on a dataset within the source document 204. For example, the source document 204 may be a spreadsheet or otherwise include a table or dataset. The dataset may include a variety of columns and/or rows containing data. The generator 228 may process the source document 204 and identify categories of data within the dataset and generate record content therefrom for the records 230.

Referring now to FIG. 5, an example graphical user interface (GUI) 500 of record content 532 is illustrated, according to an embodiment herein. Some or all of the record content 532 may be extracted from the source document 204 and may correspond to a dataset within the source document 204. As illustrated, the record content 532 may include columns corresponding to different categories of data/information. For example, the record content 532 includes a data type column 534A and a name column 534B. The content in the columns 534A and 534B may be extracted from the source document 204 by the generator 228. As illustrated, the content of the column 534A is a data or field type, such as an email, number, text, date, listing of values, and the like. The content of column 543B is the corresponding data to which the data or field type corresponds to. In some embodiments, when the source document 204 is uploaded to the collections engine 202, the generator 228 may determine the data or field type for content in the dataset and generate the column 534A.

The record content 532 may also include columns 534C and 534D. The columns 534C and 534D may be generated by the generator 228 and populated either automatically by the generator 228 or by the collection creator 209. As illustrated, the column 534C indicates whether the content in a respective row is editable by the record owners and the column 534D indicates whether the content in the respective row is visible by the record owners. As can be appreciated, there may be scenarios in which the source document 204 includes queries or prompts to which the collection creator 209 indicates that the record owner can edit in the column 534C. Similarly, it can be appreciated that there may be scenarios in which the source document 204 includes data or information that the collection creator 209 indicates should not be visible to record owners.

Figure 6:
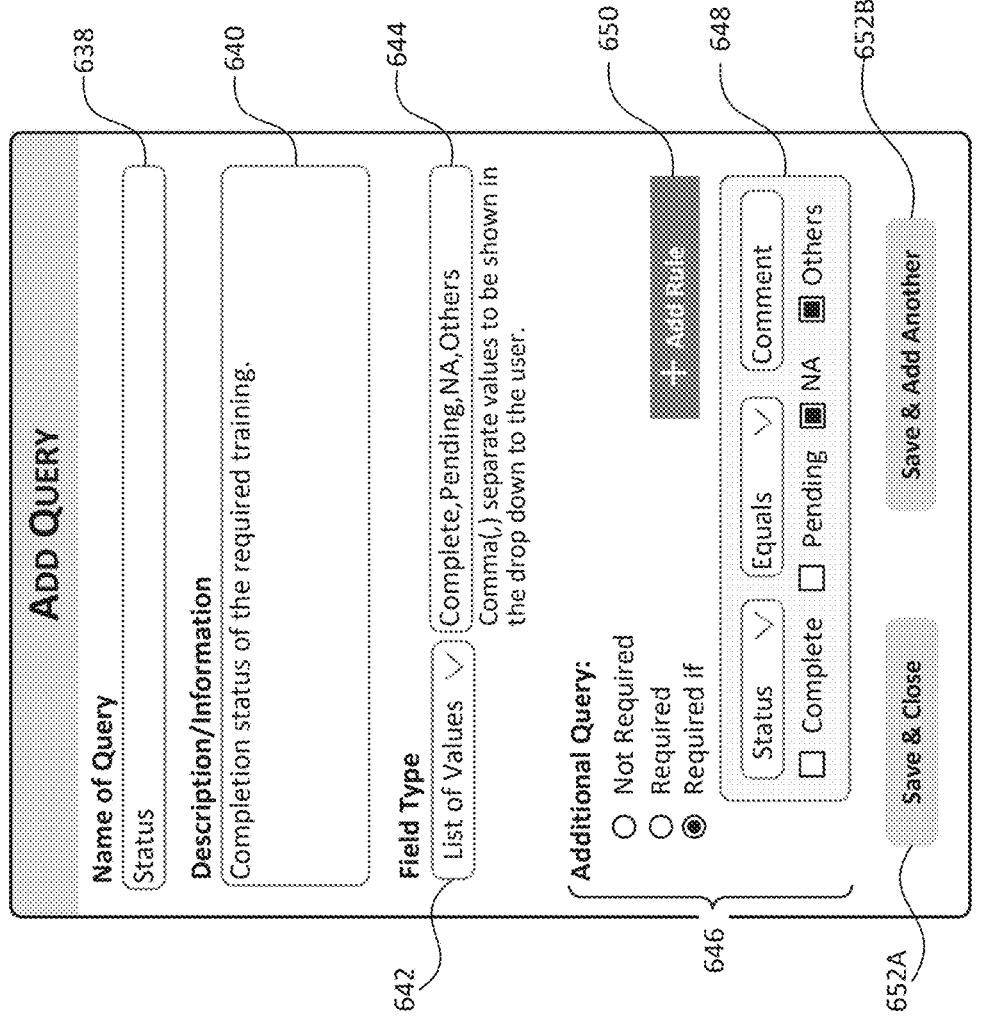
FIG. 6 illustrates an example prompt for adding additional content to a response collection, according to an embodiment herein.

The collection creator 209 may desire to add additional content to the record content 532. To do so, the collection creator 209 may select an option 536. Upon selection of the option 536, the collection engine 202, in particular the generator 228, may provide a prompt to the collection creator 209 for adding additional content. Referring now to FIG. 6, an example prompt 600 for adding additional content, such as a query, to a response collection is illustrated, according to an embodiment herein. The prompt 600 may be provided by the generator 228 and allows the collection creator 209 to add additional record content (e.g., a query or prompt) to the record content 532. That is, the collection creator 209 can add additional record content to the record content that is extracted from the source document 204. In this manner, the record content 532 can include content that is both extracted from the source document 204 and content created by the collection creator 209. As can be appreciated, there may be scenarios in which the record content 532 contains only content extracted from the source document 204, only content created by the collection creator 209, or content that is both extracted from the source document 204 and created by the collection creator 209.

As shown, the prompt 600 include a name field 638 for naming the content being created by the prompt 600. Here, the collection creator 209 input the name "Status" into the name field 638. As such, the name "Status" for the corresponding record content will be included in the column 534B, as will be described below with respect to FIG. 7. In addition to naming the new record content, the collection creator 209 can provide a description or additional information about the record content in field 640. Here, the collection creator 209 describes that this content corresponds to "completion status of the required training."

At selection 642, the collection creator 209 can specify the field type for the new content. As noted above, the field type may include date, number, email, text, listing of values, and the like. As such, the selection 642 may correspond to the information provided in the column 534A, as will be described below with respect to FIG. 7. As shown, the collection creator 209 selects a field type of "list of values." Since the field type is a "list of values," the prompt 600 provides field 644 that allows the collection creator 209 to input what values should be provided on the "list of values" provided on the records 230. Here, the "list of values" includes "complete, pending, NA, others." As can be appreciated, the collection creator 209 may input any values into the field 644, as required by the new content.

The prompt 600 also includes an additional query 646 for the new content. That is, in addition to selecting one of the listed values (e.g., complete, pending, NA, or others), the recipient may be prompted with an additional query depending on his/her response to the listed values. As shown, the collection creator 209 creates a rule 648 in which an additional query 646 is "required if" the recipient indicates that the status is "NA" or "Others." In other words, if the record owner answers the content generated by the prompt 600 by selecting "NA" or "Others," then the record owner will be further prompted to provide a comment. For example, if the record owner answers that his or her status for the required training is "NA" or "Others," the record owner is required to provide additional comment on this status, such as "no longer with this department" or "delegated this record."

The prompt 600 also provides an option 650 to add additional rules for the content generated by the prompt 600. As should be appreciated, the option 650 may include various controls over how rules are added to the prompt 600. For example, if a second rule is added to the prompt 600 (not shown), the content creator 209 can indicate whether the second rule is to be applied in addition to the rule 648 (e.g., first rule in this example), or if the second rule should be applied in an alternative to the rule 648. As those skilled in the art readily appreciate, the prompt 600 allows the content creator 209 to create rules to apply to the content of the record content 532 in a variety of manners.

Once the collection creator 209 completes the prompt 600, the collection creator 209 can select an option 652A to save and close the prompt 600 or option 652B to save and add another content to the record content. If the collection creator 209 selects the option 652B, another prompt, similar to the prompt 600, may be provided by the generator 228 to the collection creator 209 to add additional content to the record content 532. If the collection creator 209, however, is done adding additional content to the record content 532, then the collection creator 209 can select the option 652B. Upon selection of the option 652B, the generator 228 generates the additional content and adds it to the record content 532.

Figure 7:
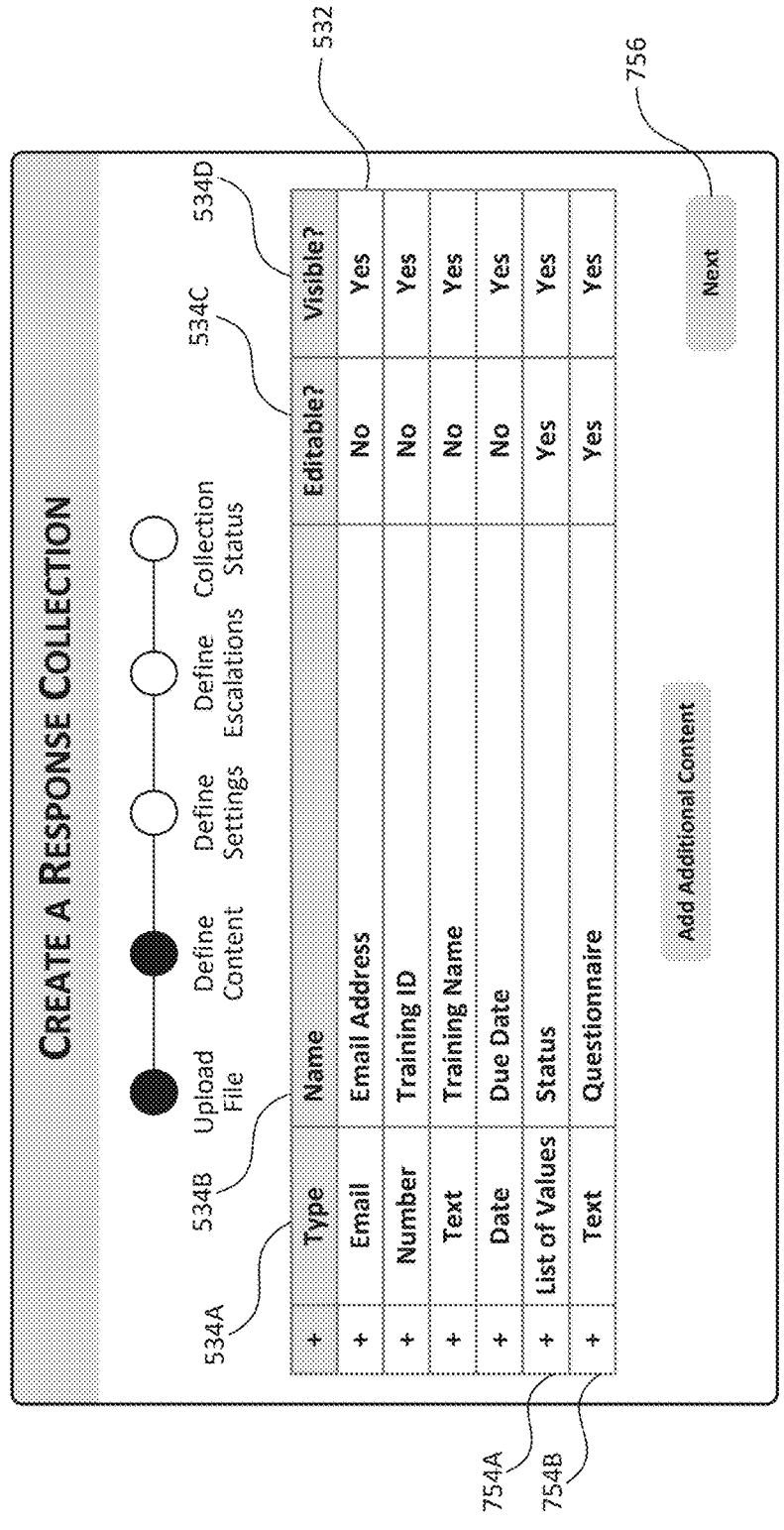
FIG. 7 illustrates an example GUI providing added record content, according to an embodiment herein.

Referring now to FIG. 7, an example GUI 700 providing the record content 532 including the additional content is illustrated, according to an embodiment herein. As illustrated, the record content 532 now includes additional content 754A and 754B. The additional content 754A and 754B may correspond to the additional content or queries created by the collection creator 209 via the prompt 600A and generated by the generator 228. Once the record content 532 includes the desired content (e.g., queries), the collection creator 209 can select an option 756. Upon selection of the option 756, the collection creator 209 can proceed to the next step in the collection generation process.

Once the record content 532 is generated, the collections engine 202 may prompt the collection creator 209 to provide one or more settings for the response collection. For example, a record ownership module 258 may assign records 230 within the response collection to a respective record owner (314) and a completion module 260 may determine one or more completion conditions 262 for each record 230 (316). To perform each of these steps, the collections engine 202 may provide the collection creator 209 with a prompt to select one or more settings for each record 230 within the response collection.

Figure 8:
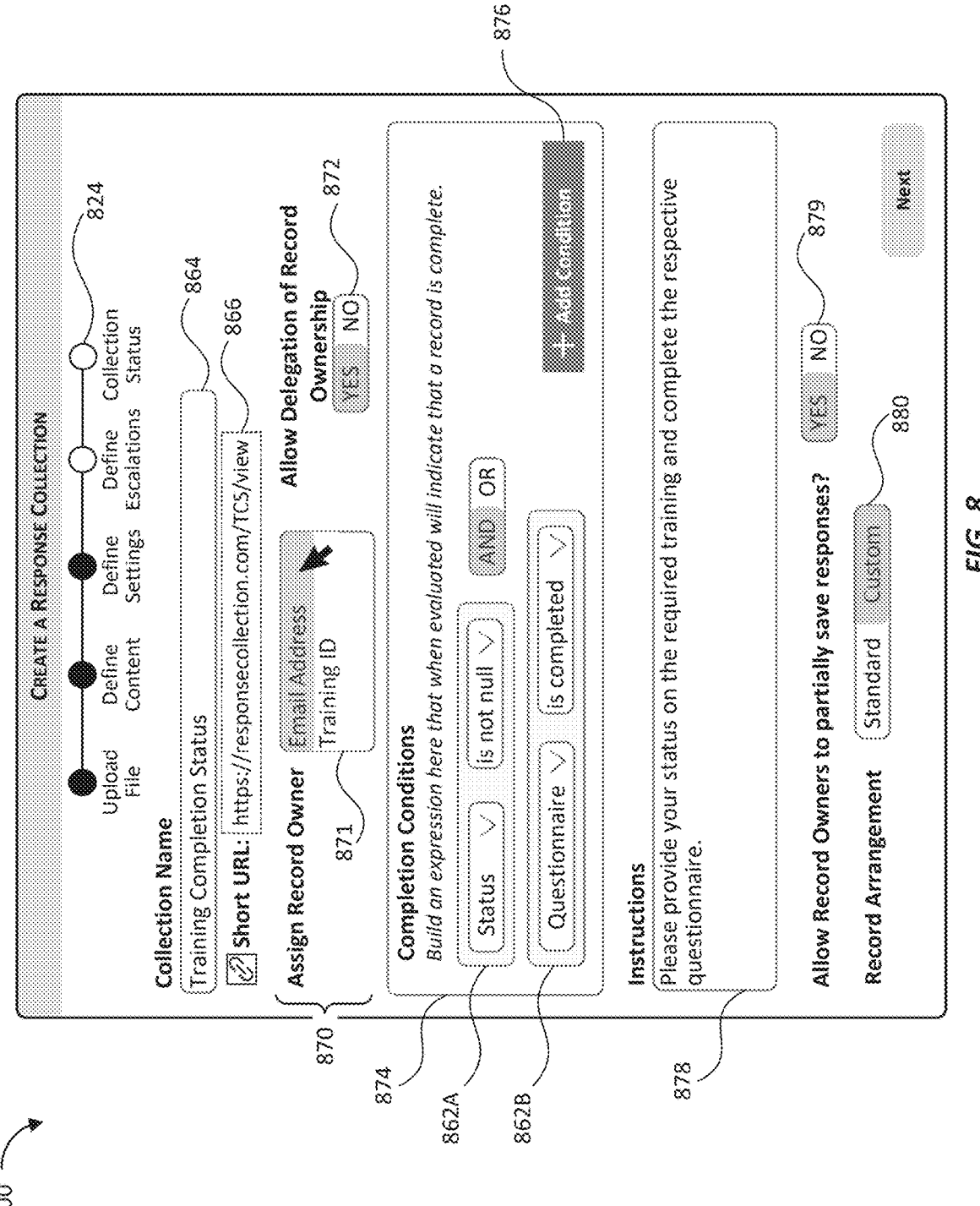
FIG. 8 illustrates an example prompt for assigning a record owner and setting one or more completion conditions for a response collection, according to an embodiment herein.

Referring now to FIG. 8, an example prompt 800 for assigning a record owner and setting one or more completion conditions for a response collection is illustrated, according to an embodiment herein. As shown, the prompt 800 includes a name field 864 in which the collection creator 209 can create a name for the response collection. Here, the collection creator 209 creates the name "Training Completion Status" into the field 864 for the response collection.

To provide record owners access to a respective record 230 of the response collection, the collections engine 202 may generate a link 866 to the respective record 230. That is, the collections engine 202 may include a record link generator 268. The record link generator 268 generates a link 866 for each individual record in the records 230. In other words, the link 866 may be generated by the record link generator 268 for each record that is specific to the record owner. In an example, the record link generator 268 generates a link 866, which is the same for all users, but when each user selects the link 866, the users can only see their respective records 230. Accordingly, only the record owner having the link 866 can access his or her respective record 230, thereby ensuring the security and confidentiality of the record 230.

The prompt 800 also provides a record assignment option 870. At option 870, a record owner may be assigned for each record 230. In the illustrated example, a dropdown 871 is provided which allows the collection creator 209 to select between different categories of record content to base the record owner assignment on. Here, the collection creator 209 can assign a ownership of the records 230 based on an email address or a training ID. As can be appreciated, in various scenarios, the prompt 800 may provide other means of assigning record ownership. For example, the record ownership module 258 may provide a listing of employees within a corresponding organization, allow the collection creator 209 to search for names associated with a corresponding organization, or manually input record owner names or other personal identification information (PII) at option 870.

The record assignment option 870 may also include a delegation option 872. The delegation option 872 allows an assigned record owner to delegate responsibility to the record 230 to another individual. For example, if the record 230 was assigned to a manager, the manager may delegate the record 230 to an associate who may have more insights or information on the content of the record 230. Once a record 230 is delegated, the delegate may be assigned as the record owner for that record. As such, the delegate may be responsible for completing the record 230 and any escalation actions performed may be with respect to the delegate, not the initial record owner. Escalation actions are described in greater detail below.

The prompt 800 also includes a completion conditions option 874. At option 874, one or more completion conditions 262 for the records 230. As described above, the completion conditions 262 are conditions to be met for a given record 230 to be completed. If a condition 262 is not met, then the respective record 230 is considered incomplete. In a simplistic example, a completion condition 262 may be that the record owner provides a response to a respective record 230. In such a scenario, if the record owner provides a response to the record 230, then the completion module 260 may determine that the completion condition 262 is satisfied and the record 230 is complete.

As shown, a completion conditions 262 may be set for different record contents within a given record 230. Here, a first completion condition 862A is generated for the record content "status" and a second completion condition 862B is generated for the record content "questionnaire." As such, the record 230 is not completed unless the first completion condition 862A is met, here the status being "not null," and the second completion condition 862B is met, here the questionnaire being completed. As can be appreciated, the completion conditions 262 may encompass any variety of expression or rule for when the collections engine 202 determines the record 230 to be completed. To add additional conditions, the prompt 800 provides an option 876.

The prompt 800 also provides additional settings that the collection creator 209 can set for the response collection. For example, the prompt 800 includes an instructions field 878 into which the collection creator 209 can generate instructions for the record owners to see with respect to each record 230. The prompt 800 also includes an option 879 to allow record owners to save partial responses and an option 880 for customizing the record arrangement. That is, the option 880 allows the collection creator 209 to customize the arrangement or visual display of the records 230 or select that a standard arrangement be used. In the illustrated example, the option 880 indicates the record arrangement is to be customized. In such an example, the collections engine 202 may provide the collection creator 209 with a prompt for customizing the record arrangement responsive to the option 880.

Figure 9:
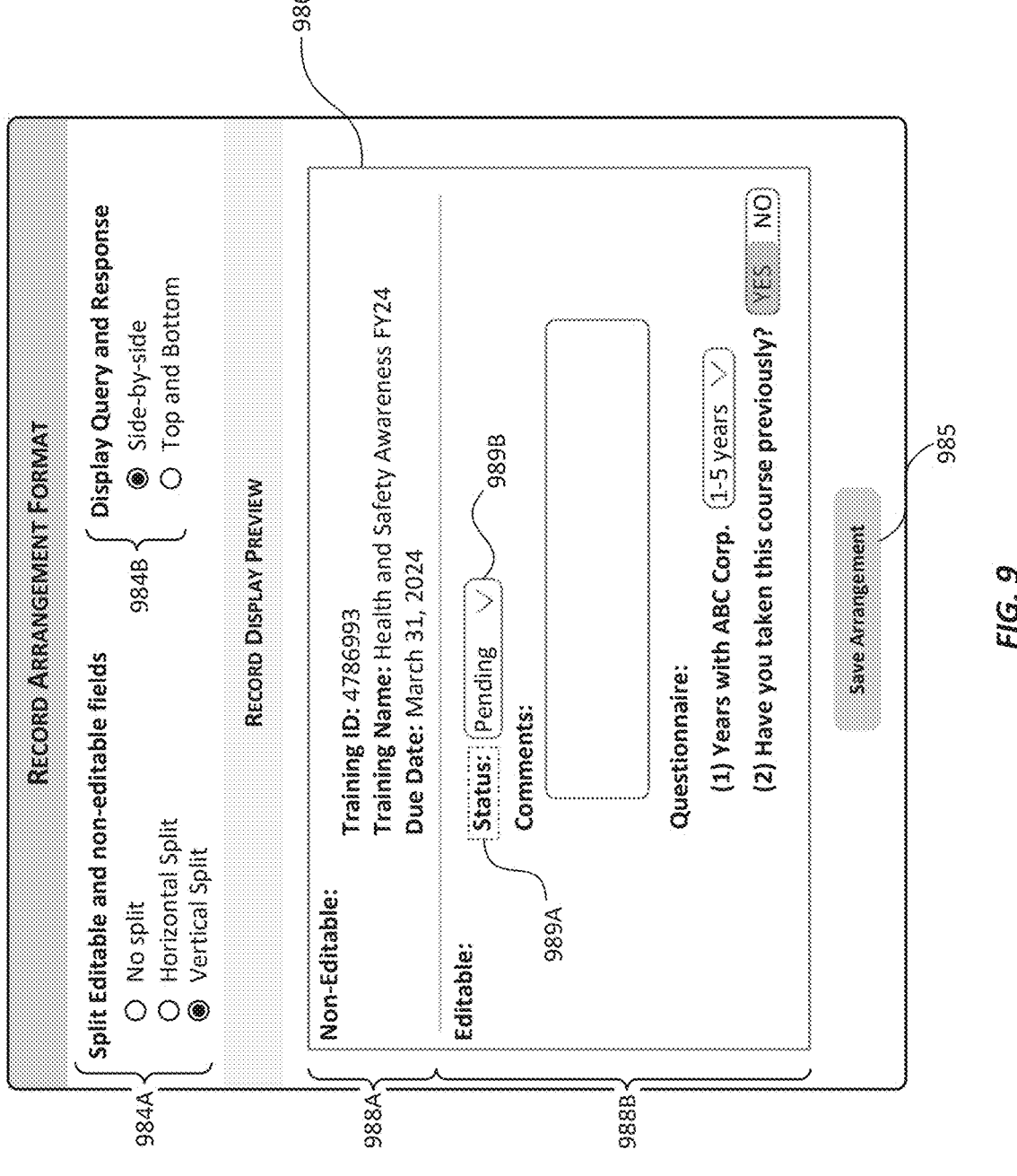
FIG. 9 illustrates an example prompt for customizing a record arrangement, according to an embodiment herein.

Referring now to FIG. 9, an example prompt 900 for customizing a record arrangement is illustrated, according to an embodiment herein. The prompt 900 may be provided by the collections engine 202, in particular the generator 228, responsive to the option 880 indication customization is desired. That is, the generator 228 may provide options for generating or modifying arrangements 282 of the records 230. In some cases, the generator 228 may include a database in which standard arrangements 282 are stored or previously customized arrangements 282 are stored. In some cases, the collections engine 202 may provide the prompt 900 as part of the collection generation process, regardless of the option 880.

As shown, the prompt 900 provides options 984A and 984B for customizing the arrangement of the record 230. It should be appreciated that the options 984A and 984B are illustrative and other options are contemplated herein for customizing the arrangement of the record 230. The option 984A provides options for splitting or arranging editable fields 988B and non-editable fields 988A within a record 230. The editable fields 988B correspond to the fields within the record content 532 that are editable by the record owner, such as the record content 754A and 754B, and the non-editable fields 988A fields within the record content 532 that are not editable by the record owner, such as the remaining content of the record content 532.

Record display preview 986 illustrates the record arrangement based on the options 984A and 984B. In the illustrated example, the editable fields 988B and non-editable fields 988A are split vertically based on the option 984A. Additionally, the option 984B provides variations in arrangement of queries and respective responses, such as query 989A on the status of the required training and response 989B. In the illustrated example, the option 984B provides the option of the query 989A and the response 989B to be arranged side-by-side. As can be appreciated, other arrangements are contemplated herein. Once the record arrangement is customized as desired, the collection creator 209 can select the option 985 to save the arrangement.

Once the option 985 is saved, the generator 228 may save the record arrangement as part of arrangements 282. As noted above, the generator 228 may save customized arrangements 282 that can be used in future response collections. That is, the collection creator 209 may customize a record arrangement 282 and save it as a preferred or favorite arrangement within the collections engine 202. Once saved, when the collection creator 209 generates a subsequent response collection, the collection creator 209 can recall the saved customized arrangement 282 to use in the subsequent collection.

The collections engine 202 may also determine one or more escalation conditions for the response collection (318). For example, during the collection generation process, the collection creator 209 may set or determine escalation conditions for the response collection. To determine the escalation conditions, the collections engine 202 may include an escalation module 290. The escalation module 290 may generate the escalation conditions for the records 230 during the collection generation process and may determine whether the escalation conditions are met once the response collection goes "live." As used herein, going "live" means that the records 230 within the collection are transmitted to the record owners for response.

Figure 10:
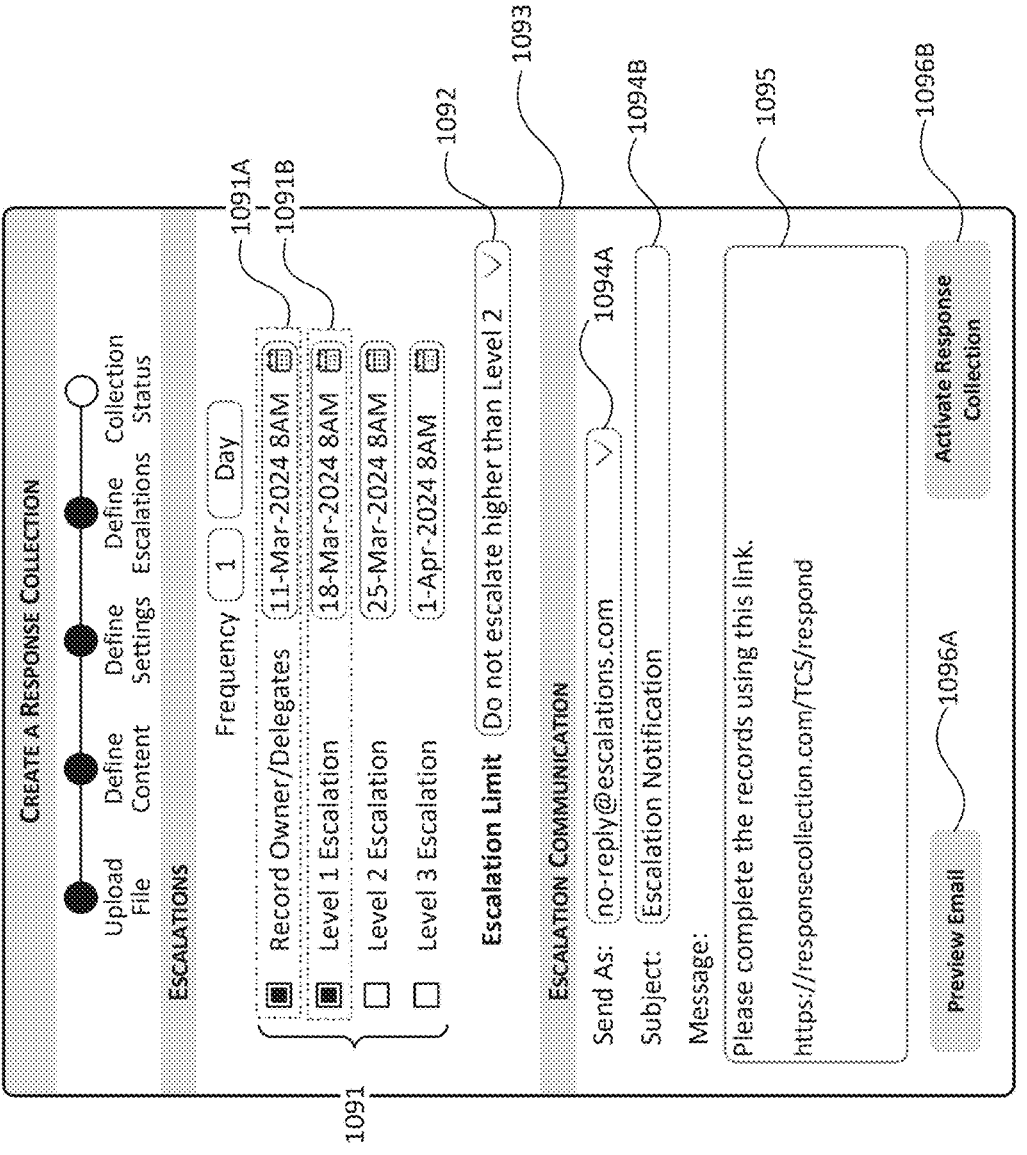
FIG. 10 illustrates an example prompt for determining escalation conditions for a response collection, according to an embodiment herein.

Referring now to FIG. 10, an example prompt 1000 for determining escalation conditions for a response collection is illustrated, according to an embodiment herein. As shown, the prompt 1000 includes a escalation actions 1091. The escalation actions 1091 may include a variety of actions that may be taken if the record 230 is not completed by a specified date. For example, the escalation action 1091A may generate an escalation communication that is sent to the record owner or delegate, if the record is not completed by a first date. An escalation communication may include a notification, email, banner, and the like.

The second escalation action 1091B may generate an escalation communication that is sent to the record owner or delegate, and a superior 213 of the record owner if the record is not completed by a second date. In scenarios where ownership of the record 230 is delegated to another individual, then the superior 213 of the delegated individual may be included in the escalation communication instead of the record owner's superior 213. The superior 213 may be an individual within the organization that is in a supervisory role over the record owner.

As shown, the escalation actions 1091 may follow an escalation hierarchy 291. The escalation hierarchy 291 may be based on a managerial or supervisory hierarchy of a corresponding organization. For example, the escalation hierarchy 291 may be fetched by the escalation module 290 from a database 215. The database 216 may be external to the collections engine 202 and may include a rolodex or information on the managerial or supervisory structure of a corresponding organization. The collections engine 202 may query the database 215 and determine who to include in each escalation action 1091 based on the escalation hierarchy 291. In some cases, the collection creator 209 may manually input the escalation hierarchy 291, while in other cases the escalation module 290 may automatically generate the escalation hierarchy 291.

The escalation actions 1091 may be bounded by an escalation limit 1092. The escalation limit 1092 may limit how far up the escalation hierarchy 291 escalation actions 1091 are performed. For example, when the escalation actions 1091 include escalation communications, such as emails to the record owner's superior 213, the escalation limit 1092 may limit the escalation communications to only reaching a specified supervisor level. In such an example, by specifying the supervisor level limit, this can avoid sending a CEO or Board of Directors escalation communications. In other scenarios, the escalation limit 1092 may limit escalation actions from being performed outside of the organization, outside of a department, or limited by any other characteristic defined by the collection creator 209.

As can be appreciated, the escalation actions 1091 may include a variety of actions that are meant to remind, notify, and prompt a record owner to respond to a record 230. For example, the escalation actions 1091 may include an escalation communication, such as a reminder email, a follow-up email with incentives, personalized outreach, limited-time offers, management endorsements, peer comparisons, interactive follow-ups, and the like.

The prompt 1000 may allow the collection creator 209 to customize an escalation communication 1093. Here, the prompt 1000 provides options 1094A and 1094B for setting an email address from which the escalation communication 1093 is sent from and a subject for the escalation communication. The prompt 1000 also provides field 1095 in which the collection creator 209 can customize a message to be included in the escalation communication 1093. To preview the escalation communication 1093, the prompt 1000 provides an option 1096A. Once the escalation conditions are set and the escalation communication 1093 is customized as desired, the collection creator 209 can select an option 1096B to activate the response collection. In particular, selection of the options 1096B causes the escalation module 290 to save the selected escalation conditions 297 for the response collection.

Activating the response collection causes the response collection to go live and the records 230 to be transmitted to the record owners (320). In the illustrated example, when the response collection goes live, each of the records 230 is transmitted to a respective record owner 205-207. Once live, the collections engine 202 monitors the response collection and each individual record 230 to determine whether the completion conditions 262 are met and whether the escalation conditions 297 are met. For example, the record owner 205 may respond to a respective record 230 and the collections engine 202, in particular the completion module 260, may determine that based on the response from the record owner 205, the completion conditions 262 associated with the record 230 are met and thus the record 230 is completed. In contrast, the record owner 207 may fail to respond to a respective record 230 and the collections engine 202, in particular, the completion module 260 may determine that based on the lack of response, the completion conditions 262 associated with the record 230 are not met, and thus the record 230 is an incomplete record.

When a record 230 is incomplete, the collections engine 202, in particular, the escalation module 290, may monitor the incomplete record 230 to determine whether one or more escalation conditions 297 are met. For example, the escalation module 290 may monitor the record 230 associated with the record owner 207 to determine whether one or more of the escalation conditions 297 are met. If the escalation module 290 determines that an escalation condition 297 is met, then the escalation module 290 may perform a respective escalation action, such as generating and transmitting an escalation email to the record owner 207 and/or the superior 213.

To track the status of the records 230 within the response collection or to track the status of collections overall, the collections engine 202 may include a report module 298. The report module 298 may generate a report of a collection status that includes the status of each record 230 with the collection. The report module 298 may also generate a report of the status of each collection generated by the collections creator 209. Each report may be displayed to the collection creator 209 by the collections engine 202.

Figure 11:
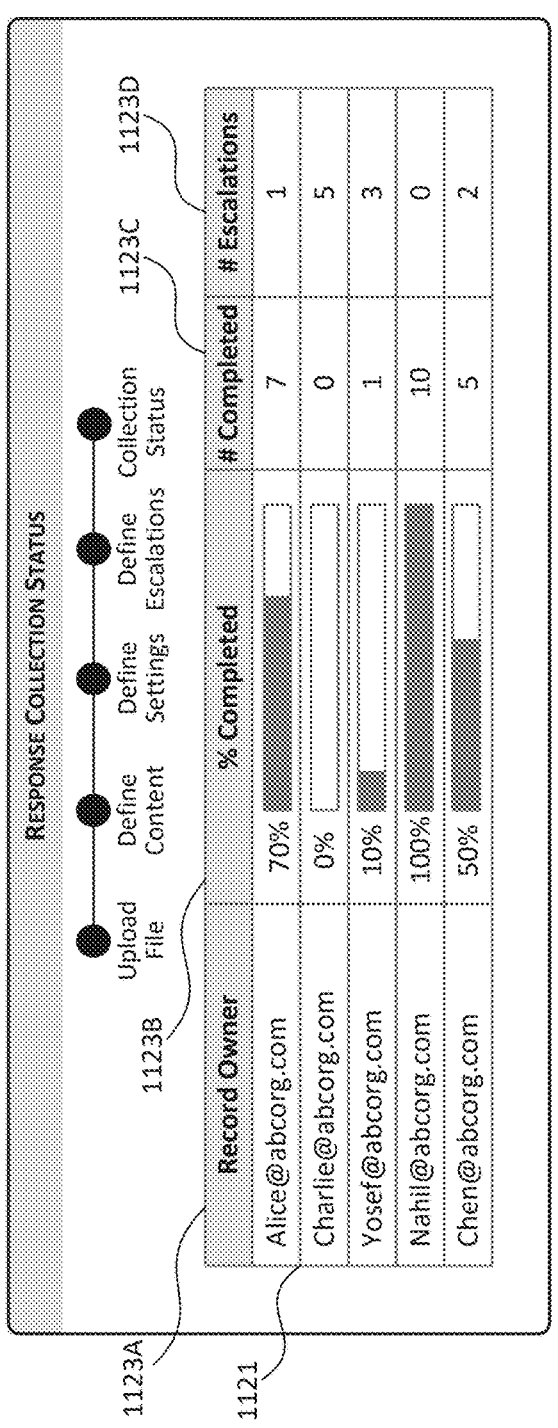
FIG. 11 illustrates an example GUI providing a response collection status report, according to an embodiment herein.

Referring now to FIG. 11, an example GUI 1100 providing a response collection status report 1121 is illustrated, according to an embodiment herein. The response collection status report 1121, hereinafter the report 1121, may provide the status of each record within the associated collection. For example, the report 1121 may include a column 1123A identifying an associated record owner, a column 1123B providing a completion status for the record, a column 1123C indicating a number of record contents responded to or completed by the record owner, and a column 1123D indicating an escalation status for the record. In other words, the collection status may include a completion status, which may indicate the number of completion conditions 262 that are met, and an escalation status, which may indicate the number of escalation conditions 297 that are met. As can be appreciated, the report 1121 may provide the collection creator 209 with important information on the status of the response collection.

In some embodiments, the response collection status report 1121 may include information relating to how many records are assigned to a respective record owner. In such an example, the response collection status report 1121 may include an indication of how many records the record owner has completed. In other words, the response collection status report 1121 may include a visualization or representation of the number of records completed by a respective record owner over a total number of records assigned to that record owner.

Figure 12:
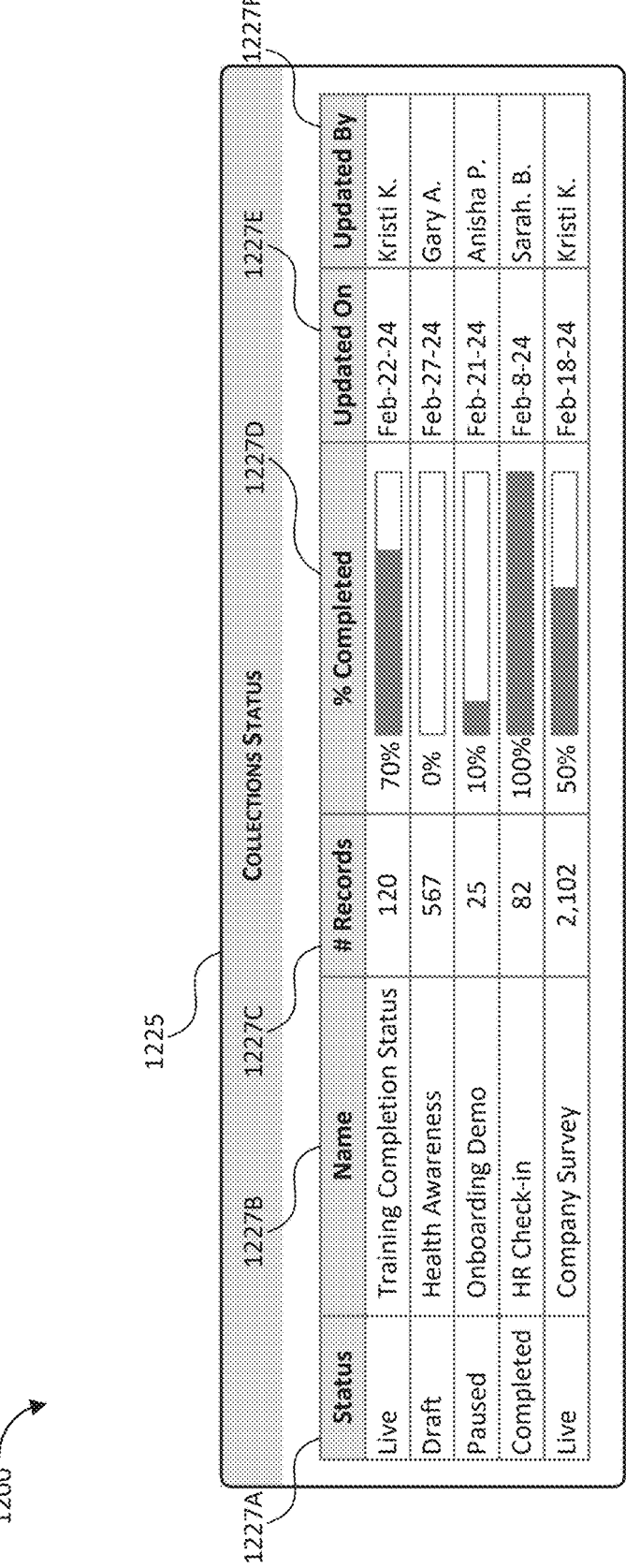
FIG. 12 illustrates an example GUI providing a collections status report, according to an embodiment herein.

Referring now to FIG. 12, an example GUI 1200 providing a collections status report 1225 is illustrated, according to an embodiment herein. As shown, the collections status 1225 provides a status 1227A of various collections that may have been generated by the collections creator 209. The collections status report 1225 provides the name 1227B of the associated collection along with a number of records 1227C in each of the collections. The collection status report 1225 also includes a completion status 1227D for each of the collections (e.g., the number of records that are completed within the respective collection), and an updated-on date 1227E. The updated-on date 1227E may indicate the latest date that the respective collection was updated by a collection creator.

In some embodiments, the collection creator 209 may delegate management or creation of a collection to another individual. For example, the collection creator 209 may generate a collection and then delegate control and management of the collection to an associate or colleague. As such, the report 1225 may include an updated-by 1227F which indicates who made the most recent updates to a given collection. As can be appreciated, the status report 1225 provides important information to the collection creator 209 on the status of each of the collections.

Referring now to FIG. 13, is a diagram of a system 1300 configured to implement a collections engine, according to an embodiment herein. The system 1300 may be an example of an apparatus including a computing apparatus 1301 that is representative of any system or collection of systems in which the various processes, systems, programs, services, and scenarios disclosed herein may be implemented. For example, computing apparatus 1301 may be an example collections engine, such as the collections engine 102, an application service, such as the application service 101, or any of the subcomponents depicted in system 100 of FIG. 1. Examples of computing apparatus 1301 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 1301 may be implemented as a single apparatus, system, or device or may be implemented in a distributed manner as multiple apparatuses, systems, or devices. Computing apparatus 1301 may include, but is not limited to, processing system 1306, storage system 1303, software 1305, communication interface system 1307, and user interface system 1309. Processing system 1306 may be operatively coupled with storage system 1303, communication interface system 1307, and user interface system 1309.

Processing system 1306 may load and execute software 1305 from storage system 1303. Software 1305 may include a collections engine 1302, which may be representative of any of the operations for providing a collections engine or any of its related functions, as discussed with respect to the preceding figures. When executed by processing system 1306, software 1305 may direct processing system 1306 to operate as described herein for at least the various processes, operational scenarios, and sequences discussed in the foregoing implementations. Computing apparatus 1301 may optionally include additional devices, features, or functionality not discussed for purposes of brevity.

In some embodiments, processing system 1306 may comprise a micro-processor and other circuitry that retrieves and executes software 1305 from storage system 1303. Processing system 1306 may be implemented within a single processing device but may also be distributed across multiple processing devices or sub-systems that cooperate in executing program instructions. Examples of processing system 1306 may include general purpose central processing units, graphical processing units, application specific processors, and logic devices, as well as any other type of processing device, combinations, or variations thereof.

Storage system 1303 may comprise any memory device or computer-readable storage medium readable by processing system 1306 and capable of storing software 1305. Storage system 1303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 1303 may also include computer readable communication media over which at least some of software 1305 may be communicated internally or externally. Storage system 1303 may be implemented as a single storage device but may also be implemented across multiple storage devices or sub-systems co-located or distributed relative to each other. Storage system 1303 may comprise additional elements, such as a controller, capable of communicating with processing system 1306 or possibly other systems.

Software 1305 (including the collections engine 1302 among other functions) may be implemented in program instructions that may, when executed by processing system 1306, direct processing system 1306 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1305 may include additional processes, programs, or components, such as operating system software, virtualization software, or other application software. Software 1305 may also comprise firmware or some other form of machine-readable processing instructions executable by processing system 1306.

In general, software 1305 may, when loaded into processing system 1306 and executed, transform a suitable apparatus, system, or device (of which computing apparatus 1301 is representative) overall from a general-purpose computing system into a special-purpose computing system as described herein. Indeed, encoding software 1305 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary storage, as well as other factors.

For example, if the computer-readable storage medium are implemented as semiconductor-based memory, software 1305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1307 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a collections engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a collections engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: receive, from a first client device, a source document comprising a dataset; generate a response collection based on the dataset, wherein the response collection comprises a plurality of records; assign a record owner to each record within the plurality of records; determine one or more completion conditions for each record in the plurality of records; determine one or more escalation conditions for an incomplete record, wherein the incomplete record is a record in which the one or more completion conditions are not met; and transmit, to a respective record owner, a first record of the plurality of records.

Example 2 is the computing apparatus of any previous or subsequent Example, the processor-executable instructions, when executed by the one or more processors, further direct the computing apparatus to: determine that the first record of the plurality of records is an incomplete record based on the one or more completion conditions; determine a first escalation condition of the one or more escalation conditions for the first record based on the first record being an incomplete record; generate a first escalation communication based on the first escalation condition; and transmit the first escalation communication to at least the respective record owner.

Example 3 is the computing apparatus of any previous or subsequent Example, wherein the processor-executable instructions, when executed by the one or more processors, further direct the computing apparatus to: receive, from a second client device, a delegation of record ownership for the first record, wherein: the second client device is the respective record owner of the first record; and the delegation of record ownership is from the second client device to a third client device; and transfer record ownership of the first record from the second client device to the third client device based on the delegation of record ownership.

Example 4 is the computing apparatus of any previous or subsequent Example, wherein: the processor-executable instructions, when executed by the one or more processors, further direct the computing apparatus to generate a record link for each respective record owner of the plurality of records, wherein a respective record is accessible via the record link; and the processor-executable instructions to transmit, to the respective record owner, the first record of the plurality of records, when executed by the one or more processors, further direct the computing apparatus to transmit, to the respective record owner, a first record link to the first record.

Example 5 is the computing apparatus of any previous or subsequent Example, wherein the processor-executable instructions, when executed by the one or more processors, further direct the computing apparatus to: generate a response collection report comprising a status of the response collection, wherein the status of the response collection comprises a record status for each record within the plurality of records; and provide the response collection report to the first client device.

Example 6 is the computing apparatus of any previous or subsequent Example, wherein the processor-executable instructions to generate the response collection based on the dataset, when executed by the one or more processors, further direct the computing apparatus to: generate one or more queries for each record within the plurality of records based on input from the first client device; determine record content for each record of the plurality of records based on the dataset and the one or more queries; and generate the response collection to include the record content.

Example 7 is the computing apparatus of any previous or subsequent Example, wherein the processor-executable instructions to determine the one or more escalation conditions for the incomplete record, when executed by the one or more processors, further direct the computing apparatus to: determine, by the collections engine, an escalation hierarchy of the one or more escalation conditions; determine, by the collections engine, a first escalation condition of the one or more escalation conditions based on the escalation hierarchy; determine, by the collections engine, an escalation limit of the one or more escalation conditions; and generate, by the collections engine, a first escalation communication based on the first escalation condition and the escalation limit.

Example 8 is a method comprising: receiving, by a collections engine, a source document comprising a dataset; generating, by the collections engine, a response collection based on the dataset, wherein the response collection comprises a plurality of records; assigning, by the collections engine, a record owner for each record within the plurality of records; determining, by the collections engine, one or more completion conditions for each record in the plurality of records; determining, by the collections engine, one or more escalation conditions for an incomplete record, wherein the incomplete record is a record in which the one or more completion conditions are not met; and transmitting, by the collections engine, a first record of the plurality of records to a respective record owner.

Example 9 is the method of any previous or subsequent Example, wherein assigning, by the collections engine, the record owner for each record within the plurality of records further comprises: determining, by the collections engine, the record owner for a respective record based on the dataset; and assigning, by the collections engine, the record owner to the respective record for completion of the respective record.

Example 10 is the method of any previous or subsequent Example, the method further comprising: receiving, by the collections engine, a first response associated with the first record from a client device; determining, by the collections engine, that the one or more completion conditions of the first record are met by the first response; and identifying, by the collections engine, the first record as completed within the response collection.

Example 11 is the method of any previous or subsequent Example, wherein: determining, by the collections engine, that the first record is an incomplete record based on the one or more completion conditions; determining, by the collections engine, a first escalation condition of the one or more escalation conditions for the first record based on the first record being an incomplete record; determining, by the collections engine, an escalation limit of the one or more escalation conditions; and generating, by the collections engine, a first escalation communication based on the first escalation condition and the escalation limit.

Example 12 is the method of any previous or subsequent Example, the method further comprising: generating, by the collections engine, a response collection report, wherein the response collection report comprises a record status for each record within the response collection, wherein the record status indicates a completion status for each respective record and an escalation status for each respective record; and providing, by the collections engine, the response collection report to a client device.

Example 13 is the method of any previous or subsequent Example, wherein generating, by the collections engine, the response collection based on the dataset further comprises: receiving, by the collections engine, one or more queries for each respective record within the plurality of records from a client device; determining, by the collections engine, record content for each respective record based on the dataset and the one or more queries; and generating, by the collections engine, the plurality of records based on the record content.

Example 14 is the method of any previous or subsequent Example, wherein each record of the plurality of records comprises a query, and determining, by the collections engine, the one or more completion conditions for each record in the plurality of records further comprises: determining, by the collections engine, a completion condition for the query, wherein the completion condition indicates that the query is completed.

Example 15 is a computer-readable storage medium comprising processor-executable instructions, wherein the processor-executable instructions comprise a collections engine configured to cause one or more processors to: receive, from a first client device, a source document comprising a dataset; generate a response collection based on the dataset, wherein the response collection comprises a plurality of records; assign a record owner to each record within the plurality of records; determine one or more completion conditions for each record in the plurality of records; determine one or more escalation conditions for an incomplete record, wherein the incomplete record is a record in which the one or more completion conditions are not met; and transmit, to a respective record owner, a first record of the plurality of records.

Example 16 is the computer-readable storage medium of any previous or subsequent Example, wherein the processor-executable instructions cause the one or more processors to further execute processor-executable instructions stored in the computer-readable storage medium to: receive a delegation of record ownership for the first record, wherein the delegation of record ownership is from a first record owner to a second record owner; and transfer record ownership of the first record from the first record owner to the second record owner.

Example 17 is the computer-readable storage medium of any previous or subsequent Example, wherein the processor-executable instructions of the collections engine to determine the one or more escalation conditions for an incomplete record cause the one or more processors to further execute processor-executable instructions stored in the computer-readable storage medium to: determine, by the collections engine, an escalation hierarchy of the one or more escalation conditions; determine, by the collections engine, a first escalation condition of the one or more escalation conditions based on the escalation hierarchy; determine, by the collections engine, an escalation limit of the one or more escalation conditions; and generate, by the collections engine, a first escalation communication based on the first escalation condition and the escalation limit.

Example 18 is the computer-readable storage medium of any previous or subsequent Example, wherein the processor-executable instructions cause the one or more processors to further execute processor-executable instructions stored in the computer-readable storage medium to: determine a completion status for each respective record within the response collection based on the one or more completion conditions; determine an escalation status for each respective record within the response collection based on the one or more escalation conditions; generate a response collection report comprising: the completion status for each respective record in the response collection; and the escalation status for each respective record in the response collection; and providing the response collection report to the first client device.

Example 19 is the computer-readable storage medium of any previous or subsequent Example, wherein the processor-executable instructions of the collections engine to generate the response collection based on the dataset cause the one or more processors to further execute processor-executable instructions stored in the computer-readable storage medium to: determine that the dataset comprises a first field type and a second field type; receive, from the first client device, at least one query to include in each of the plurality of records; and generate each of the plurality of records to include the first field type, the second field type, and the at least one query, wherein the at least one query requires a response from the respective record owner.

Example 20 is the computer-readable storage medium of any previous or subsequent Example, wherein the processor-executable instructions of the collections engine to generate the response collection based on the dataset cause the one or more processors to further execute processor-executable instructions stored in the computer-readable storage medium to: determine at least one query to include in each of the plurality of records, wherein the at least one query requires a response from the respective record owner; determine that the dataset comprises non-editable content, wherein each of the plurality of records comprises the non-editable content; determine an arrangement of the non-editable content and the at least one query for display to a respective record owner; and generate the plurality of records based on the arrangement.

What is claimed is:

1. A computing apparatus comprising:
a computer-readable storage medium;
a collections engine comprising processor-executable instructions stored on the computer-readable storage medium and configured to aid a user in managing a response collection process; and
one or more processors coupled to the computer-readable storage medium and configured to execute the processor-executable instructions, wherein the processor-executable instructions, when executed by the one or more processors, direct the computing apparatus, to at least:
receive, from a first client device, a source document comprising a dataset;
generate a response collection based on the dataset, wherein:
the response collection comprises a plurality of records; and
each record of the plurality of records is configured to accept an input from a respective record owner and configured to elicit a response from the respective record owner;

automatically assign a respective record owner to each record within the plurality of records, wherein each record owner corresponds to a record ownership and has access to at least modify the input of the respective record;

determine one or more completion conditions for each record in the plurality of records;

determine one or more escalation conditions for an incomplete record, wherein the incomplete record is a record in which the one or more completion conditions are not met;

responsive to assigning the record owner, automatically generate a record link for each respective record owner of the plurality of records, the record link providing individualized and secure that provides electronic access to the respective record, the record link being associated with the respective record owner in a database;

track completion and escalation conditions for each record based on received responses; and transmit, to a respective record owner, a first record of the plurality of records.

2. The computing apparatus of claim 1, the processor-executable instructions, when executed by the one or more processors, further direct the computing apparatus to:

determine that the first record of the plurality of records is an incomplete record based on the one or more completion conditions;

determine a first escalation condition of the one or more escalation conditions for the first record based on the first record being an incomplete record;

generate a first escalation communication based on the first escalation condition; and transmit the first escalation communication to at least the respective record owner.

3. The computing apparatus of claim 1, wherein the processor-executable instructions, when executed by the one or more processors, further direct the computing apparatus to:

receive, from a second client device, a delegation of record ownership for the first record, wherein:

the second client device is the respective record owner of the first record; and the delegation of record ownership is from the second client device to a third client device; and transfer record ownership of the first record from the second client device to the third client device based on the delegation of record ownership.

4. The computing apparatus of claim 1, wherein the processor-executable instructions to transmit, to the respective record owner, the first record of the plurality of records, when executed by the one or more processors, further direct the computing apparatus to transmit, to the respective record owner, a first record link to the first record.

5. The computing apparatus of claim 1, wherein the processor-executable instructions, when executed by the one or more processors, further direct the computing apparatus to:

generate a response collection report comprising a status of the response collection, wherein the status of the response collection comprises a record status for each record within the plurality of records; and provide the response collection report to the first client device.

6. The computing apparatus of claim 1, wherein the processor-executable instructions to generate the response collection based on the dataset, when executed by the one or more processors, further direct the computing apparatus to:

generate one or more queries for each record within the plurality of records based on input from the first client device;

determine record content for each record of the plurality of records based on the dataset and the one or more queries; and generate the response collection to include the record content.

7. The computing apparatus of claim 1, wherein the processor-executable instructions to determine the one or more escalation conditions for the incomplete record, when executed by the one or more processors, further direct the computing apparatus to:

determine, by the collections engine, an escalation hierarchy of the one or more escalation conditions;

determine, by the collections engine, a first escalation condition of the one or more escalation conditions based on the escalation hierarchy;

determine, by the collections engine, an escalation limit of the one or more escalation conditions; and generate, by the collections engine, a first escalation communication based on the first escalation condition and the escalation limit.

8. A method comprising:

receiving, by a collections engine, a source document comprising a dataset;

generating, by the collections engine, a response collection based on the dataset, wherein:

the response collection comprises a plurality of records; and each record of the plurality of records is configured to accept an input from a respective record owner and configured to elicit a response from the respective record owner;

automatically assigning, by the collections engine, a respective record owner for each record within the plurality of records, wherein each record owner corresponds to a record ownership and has access to at least modify the input of the respective record;

determining, by the collections engine, one or more completion conditions for each record in the plurality of records;

determining, by the collections engine, one or more escalation conditions for an incomplete record, wherein the incomplete record is a record in which the one or more completion conditions are not met;

responsive to assigning the record owner, automatically generating a record link for each respective record owner of the plurality of records, the record link providing individualized and secure electronic access to the respective record, the record link being associated with the respective record owner in a database;

tracking, by the collections engine, completion and escalation conditions for each record based on received responses; and transmitting, by the collections engine, a first record of the plurality of records to a respective record owner.

9. The method of claim 8, wherein assigning, by the collections engine, the record owner for each record within the plurality of records further comprises:

determining, by the collections engine, the record owner for a respective record based on the dataset; and assigning, by the collections engine, the record owner to the respective record for completion of the respective record.

10. The method of claim 8, the method further comprising:

receiving, by the collections engine, a first response associated with the first record from a client device;

determining, by the collections engine, that the one or more completion conditions of the first record are met by the first response; and identifying, by the collections engine, the first record as completed within the response collection.

11. The method of claim 8, wherein:

determining, by the collections engine, that the first record is an incomplete record based on the one or more completion conditions;

determining, by the collections engine, a first escalation condition of the one or more escalation conditions for the first record based on the first record being an incomplete record;

determining, by the collections engine, an escalation limit of the one or more escalation conditions; and generating, by the collections engine, a first escalation communication based on the first escalation condition and the escalation limit.

12. The method of claim 8, the method further comprising:

generating, by the collections engine, a response collection report, wherein the response collection report comprises a record status for each record within the response collection, wherein the record status indicates a completion status for each respective record and an escalation status for each respective record; and providing, by the collections engine, the response collection report to a client device.

13. The method of claim 8, wherein generating, by the collections engine, the response collection based on the dataset further comprises:

receiving, by the collections engine, one or more queries for each respective record within the plurality of records from a client device;

determining, by the collections engine, record content for each respective record based on the dataset and the one or more queries; and generating, by the collections engine, the plurality of records based on the record content.

14. The method of claim 8, wherein each record of the plurality of records comprises a query, and determining, by the collections engine, the one or more completion conditions for each record in the plurality of records further comprises:

determining, by the collections engine, a completion condition for the query, wherein the completion condition indicates that the query is completed.

15. A computer-readable storage medium comprising processor-executable instructions, wherein the processor-executable instructions comprise a collections engine configured to cause one or more processors to:

receive, from a first client device, a source document comprising a dataset;

generate a response collection based on the dataset, wherein:

the response collection comprises a plurality of records; and each record of the plurality of records is configured to accept an input from a respective record owner and configured to elicit a response from the respective record owner;

automatically assign a respective record owner to each record within the plurality of records, wherein each record owner corresponds to a record ownership and has access to at least modify the input of the respective record;

determine one or more completion conditions for each record in the plurality of records;

determine one or more escalation conditions for an incomplete record, wherein the incomplete record is a record in which the one or more completion conditions are not met;

responsive to assigning the record owner, automatically generate a record link for each respective record owner of the plurality of records, the record link providing individualized and secure electronic access to the respective record, the record link being associated with the respective record owner in a database;

track completion and escalation conditions for each record based on received responses; and transmit, to a respective record owner, a first record of the plurality of records.

16. The computer-readable storage medium of claim 15, wherein the processor-executable instructions cause the one or more processors to further execute processor-executable instructions stored in the computer-readable storage medium to:

receive a delegation of record ownership for the first record, wherein the delegation of record ownership is from a first record owner to a second record owner; and transfer record ownership of the first record from the first record owner to the second record owner.

17. The computer-readable storage medium of claim 15, wherein the processor-executable instructions of the collections engine to determine the one or more escalation conditions for an incomplete record cause the one or more processors to further execute processor-executable instructions stored in the computer-readable storage medium to:

determine, by the collections engine, an escalation hierarchy of the one or more escalation conditions;

determine, by the collections engine, a first escalation condition of the one or more escalation conditions based on the escalation hierarchy;

determine, by the collections engine, an escalation limit of the one or more escalation conditions; and generate, by the collections engine, a first escalation communication based on the first escalation condition and the escalation limit.

18. The computer-readable storage medium of claim 15, wherein the processor-executable instructions cause the one or more processors to further execute processor-executable instructions stored in the computer-readable storage medium to:

determine a completion status for each respective record within the response collection based on the one or more completion conditions;

determine an escalation status for each respective record within the response collection based on the one or more escalation conditions;

generate a response collection report comprising:

the completion status for each respective record in the response collection; and the escalation status for each respective record in the response collection; and providing the response collection report to the first client device.

19. The computer-readable storage medium of claim 15, wherein the processor-executable instructions of the collections engine to generate the response collection based on the dataset cause the one or more processors to further execute processor-executable instructions stored in the computer-readable storage medium to:
- determine that the dataset comprises a first field type and a second field type;
- receive, from the first client device, at least one query to include in each of the plurality of records; and
- generate each of the plurality of records to include the first field type, the second field type, and the at least one query, wherein the at least one query requires a response from the respective record owner.

20. The computer-readable storage medium of claim 15, wherein the processor-executable instructions of the collections engine to generate the response collection based on the dataset cause the one or more processors to further execute processor-executable instructions stored in the computer-readable storage medium to:
- determine at least one query to include in each of the plurality of records, wherein the at least one query requires a response from the respective record owner;
- determine that the dataset comprises non-editable content, wherein each of the plurality of records comprises the non-editable content;
- determine an arrangement of the non-editable content and the at least one query for display to a respective record owner; and
- generate the plurality of records based on the arrangement.

* * * * *